US012759235B2

(12) United States Patent
Wright et al.

(10) Patent No.: US 12,759,235 B2
(45) Date of Patent: Oct. 13, 2026

(54) DETERMINING POWDER DEGRADATION

(71) Applicant: Peridot Print LLC, Palo Alto, CA (US)

(72) Inventors: Jacob Wright, San Diego, CA (US); Maria Fabiola Leyva Mendivil, Guadalajara (MX); Lei Chen, Shanghai (CN); Sunil Kothari, Palo Alto, CA (US); Jun Zeng, Palo Alto, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 414 days.

(21) Appl. No.: 18/279,129

(22) PCT Filed: Mar. 9, 2021

(86) PCT No.: PCT/US2021/021445
§ 371 (c)(1),
(2) Date: Aug. 28, 2023

(87) PCT Pub. No.: WO2022/191822
PCT Pub. Date: Sep. 15, 2022

(65) Prior Publication Data

US 2024/0123689 A1 Apr. 18, 2024

(51) Int. Cl.

| | |
|---|---|
| ***B29C 64/386*** | (2017.01) |
| ***B22F 10/80*** | (2021.01) |
| ***B33Y 50/00*** | (2015.01) |
| ***G05B 19/4099*** | (2006.01) |

(Continued)

(52) U.S. Cl.
CPC ............ *B29C 64/386* (2017.08); *B22F 10/80* (2021.01); *B33Y 50/00* (2014.12); *G05B 19/4099* (2013.01); *B22F 10/14* (2021.01); *B29C 64/165* (2017.08); *G05B 2219/49023* (2013.01)

(58) Field of Classification Search
CPC ..... B29C 64/386; B29C 64/165; B22F 10/80; B22F 10/14; B22F 10/73; B22F 10/28; B33Y 50/00; B33Y 10/00; B33Y 40/00; G05B 19/4099; G05B 2219/49023; G06N 20/00
See application file for complete search history.

(56) References Cited

U.S. PATENT DOCUMENTS

| | | | |
|---|---|---|---|
| 9,489,620 | B2 | 11/2016 | Wang et al. |
| 2012/0065755 | A1 | 3/2012 | Steingart et al. |
| 2018/0322621 | A1 | 11/2018 | Craeghs et al. |

(Continued)

FOREIGN PATENT DOCUMENTS

| | | | |
|---|---|---|---|
| CN | 108941553 | A | 12/2018 |
| WO | 2016/171649 | A1 | 10/2016 |

(Continued)

*Primary Examiner* — Yuhui R Pan
(74) *Attorney, Agent, or Firm* — Michael Dryja

(57) ABSTRACT

An example system includes a simulation engine to determine a plurality of thermal states that will be experienced by powder at a voxel of a three-dimensional print volume as a result of printing a particular build. Each thermal state corresponds to a time during the printing or cooling from the printing. The system includes a stress engine to calculate a stress to the powder at the voxel based on the plurality of thermal states. The system includes a degradation engine to determine an amount of degradation of the powder at the voxel based on the stress.

16 Claims, 6 Drawing Sheets

(51) Int. Cl.
*B22F 10/14* (2021.01)
*B29C 64/165* (2017.01)

(56) References Cited

U.S. PATENT DOCUMENTS

| | | | | |
|---|---|---|---|---|
| 2018/0339466 | A1 | 11/2018 | El et al. | |
| 2019/0054696 | A1 * | 2/2019 | Alonso .................. | B33Y 70/00 |
| 2019/0138926 | A1 | 5/2019 | Huang et al. | |
| 2019/0143412 | A1 | 5/2019 | Buller et al. | |
| 2019/0143413 | A1 | 5/2019 | Dave et al. | |
| 2019/0384274 | A1 | 12/2019 | Bharadwaj et al. | |
| 2019/0384878 | A1 | 12/2019 | Darcy et al. | |
| 2020/0089826 | A1 | 3/2020 | Liu et al. | |
| 2020/0096970 | A1 | 3/2020 | Mehr et al. | |
| 2020/0311934 | A1 | 10/2020 | Cherkas et al. | |
| 2020/0333295 | A1 * | 10/2020 | Schiffres ................ | G06N 20/00 |
| 2020/0376751 | A1 | 12/2020 | Ferrar | |
| 2021/0162509 | A1 * | 6/2021 | Ferrar ................... | B29C 64/386 |
| 2021/0283717 | A1 | 9/2021 | Iyer et al. | |

FOREIGN PATENT DOCUMENTS

| | | | | | |
|---|---|---|---|---|---|
| WO | WO-2020091726 | A1 * | 5/2020 | ............... | G06N 3/09 |
| WO | 2020/226605 | A1 | 11/2020 | | |
| WO | WO-2020246993 | A1 * | 12/2020 | ............. | B33Y 50/00 |
| WO | 2021/123737 | A1 | 6/2021 | | |

* cited by examiner

300

400

DETERMINING POWDER DEGRADATION

BACKGROUND

Additive manufacturing is a technique to form three-dimensional (3D) objects by adding material until the object is formed. The material may be added by forming several layers of material with each layer stacked on top of the previous layer. Additive manufacturing is also referred to as 3D printing. Examples of 3D printing include melting a filament to form each layer of the 3D object (e.g., fused filament fabrication), curing a resin to form each layer of the 3D object (e.g., stereolithography), sintering, melting, or binding powder to form each layer of the 3D object (e.g., selective laser sintering or melting, multijet fusion, metal jet fusion, etc.), and binding sheets of material to form the 3D object (e.g., laminated object manufacturing, etc.).

DETAILED DESCRIPTION

Figure 1:
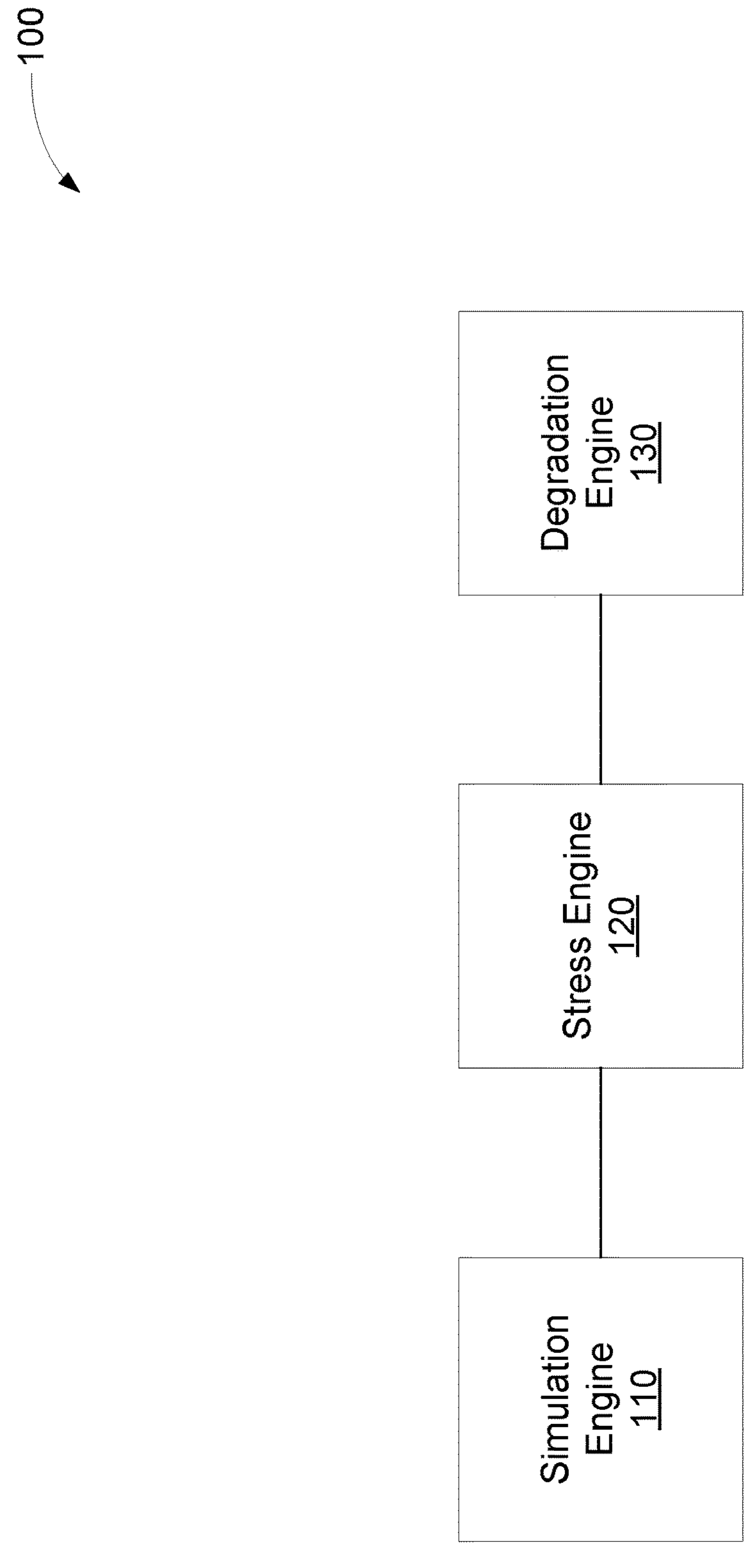
FIG. 1 is a block diagram of an example system to determine how much powder degradation will occur for a particular 3D print.

In many types of three-dimensional (3D) printing, layers of powder are delivered to a print bed. After each layer is delivered, heat is applied to portions of the layer to cause the powder to coalesce (e.g., sinter) in those portions or to remove solvents from a binding agent. For example, a fusing agent or a binding agent may be applied to portions that should coalesce or bind, and a detailing agent may be applied to portions that should not coalesce. An energy source may deliver energy that is absorbed by the fusing agent to cause the powder to coalesce. Additional layers are delivered and selectively heated to build up a 3D object from the coalesced powder. After all of the layers have been delivered and heated, the print volume is allowed to cool for a period of time. The 3D objects are then removed from the print volume. The remaining powder can be recycled or discarded. Recycling the powder reduces waste and reduces the cost of printing each part. As used herein, the term "print volume" refers to the space occupied (or to be occupied) by powder and printed parts as a result of the print process.

Unfortunately, the powders may degrade and oxidize when exposed to elevated temperatures. For example, polymer powders, such as polyamide 12 (PA 12), may degrade during 3D printing due to the exposure to elevated temperatures. In some examples, the powder may spend 30 to 40 hours above 160° C. during the printing and cooling process, which is sufficient to cause powder degradation. Repeated printing may cause the powder to become degraded enough to affect the 3D printing process. For example, degraded powder may cause surface distortions, such as an orange peel effect, poor mechanical properties, off-gassing that creates porosity in the part, and the like.

Various remediation techniques may be used to limit the degradation. For example, antioxidant packages may be included inside the powder, but the degradation may still occur. Using a nitrogen environment during 3D printing can reduce oxidation. However, oxygen can be dissolved in the powder or can enter the powder. Accordingly, the remediation techniques may have limited effectiveness. Moreover, the remediation techniques may increase the printing cost.

The degradation can also be remediated by mixing fresh powder with recycled powder. As used herein, the term "fresh powder" refers to powder that has not been used for 3D printing, and the term "recycled powder" refers to powder that has been through the 3D printing process. A quality metric may be used to determine the amount of degradation of the powder. For example, the quality metric may be the relative solution viscosity, the molecular weight, or the like, which may correlate with the amount of degradation. For PA 12, the quality metric may be a measurement of color. The amount of degradation of PA 12 is highly correlated with the color of the powder. For example, the amount of degradation is highly correlated with the b* component of the CIELAB color space.

Fresh powder can be added to the recycled powder to keep the quality metric above a threshold. For example, a user may target to use powder with a b* of less than 4. Unfortunately, it can be difficult to know how much powder will degrade during a particular print. The powder experiences a 30-40 hour temperature profile. The degradation is affected by the ability of gases to diffuse into the surrounding environment, which in turn depends on the arrangement of parts, and by the amount of agent (e.g., a detailing agent, a color agent, or the like) delivered to the powder. There is no closed form solution for numerically computing how the powder degrades due to these various factors. Accordingly, 3D printing could be improved by being able to determine how powder will degrade during a particular 3D print.

FIG. 1 is a block diagram of an example system 100 to determine how much powder degradation will occur for a particular 3D print. The system 100 may include a simulation engine 110. As used herein, the term "engine" refers to hardware (e.g., analog or digital circuitry, a processor, such as an integrated circuit, or other circuitry, etc.) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random-access memory (RAM), a hard-disk or solid-state drive, resistive memory, or optical media such as a digital versatile disc (DVD), and/or executed or interpreted by a processor), or hardware and software hosted at hardware. The simulation engine 110 may determine a plurality of thermal states that will be experienced by powder at a voxel of a 3D print volume as a result of printing a particular build. Each thermal state may correspond to a time during the printing or during cooling from the printing. For example, the simulation engine 110 may determine for each time during the printing what the thermal state of the voxel will be based on the operations of the printer up to that point in time, previous thermal states, or the environmental/boundary conditions. In some examples, the simulation engine 110 may simulate the thermal states of all the voxels in the print volume (e.g., all the voxels that include powder at that point in time) and the thermal state of each voxel may be determined at least in part based on the thermal states of other voxels (e.g., nearby voxels) at previous points in time. The simulation engine 110 may simulate the thermal states of the voxel during cooling based on the previous thermal states of the voxel or other voxels or based on the environmental/boundary conditions.

The system 100 may include a stress engine 120. The stress engine 120 may calculate a stress to the powder at the voxel based on the plurality of thermal states. The term "stress" refers to a number indicative of how much degradation will be experienced by the powder due to an environmental factor. The amount of degradation may depend on the interaction between multiple environmental factors, so various amounts of degradation may result from a particular amount of stress due to one environmental factor depending on the state of other environmental factors. The environmental factors may include the temperature, the amount of oxygen present at or near the voxel (or how well the oxygen is able to diffuse from the voxel), the amount of water or other substances present at or near the voxel (e.g., due to humidity, agents delivered to the print volume, etc.), or the like. The stress may or may not be in defined units. For example, the stress may be specified in a set of custom arbitrary units. In addition, stresses from different environmental factors may be in different units. In some examples, the stress engine 120 may calculate the stress based on the plurality of thermal states by suitably combining values representing the thermal states into a scalar value representing the stress. When combining the values representing the thermal states, the time at each state or the time transitioning between states may also be used to combine the values.

The system 100 may include a degradation engine 130. The degradation engine 130 may determine an amount of degradation of the powder at the voxel based on the stress. For example, the degradation engine 130 may determine how much degradation results from the interaction of other environmental factors with the stress from the thermal states. The degradation engine 130 may quantify the degradation in terms of a quality metric. For example, the degradation engine 130 may determine the amount of degradation by determining a final quality metric for the powder at the voxel after printing or cooling, by specifying a change in the quality metric that will result from the printing or cooling, or the like.

Figure 2:
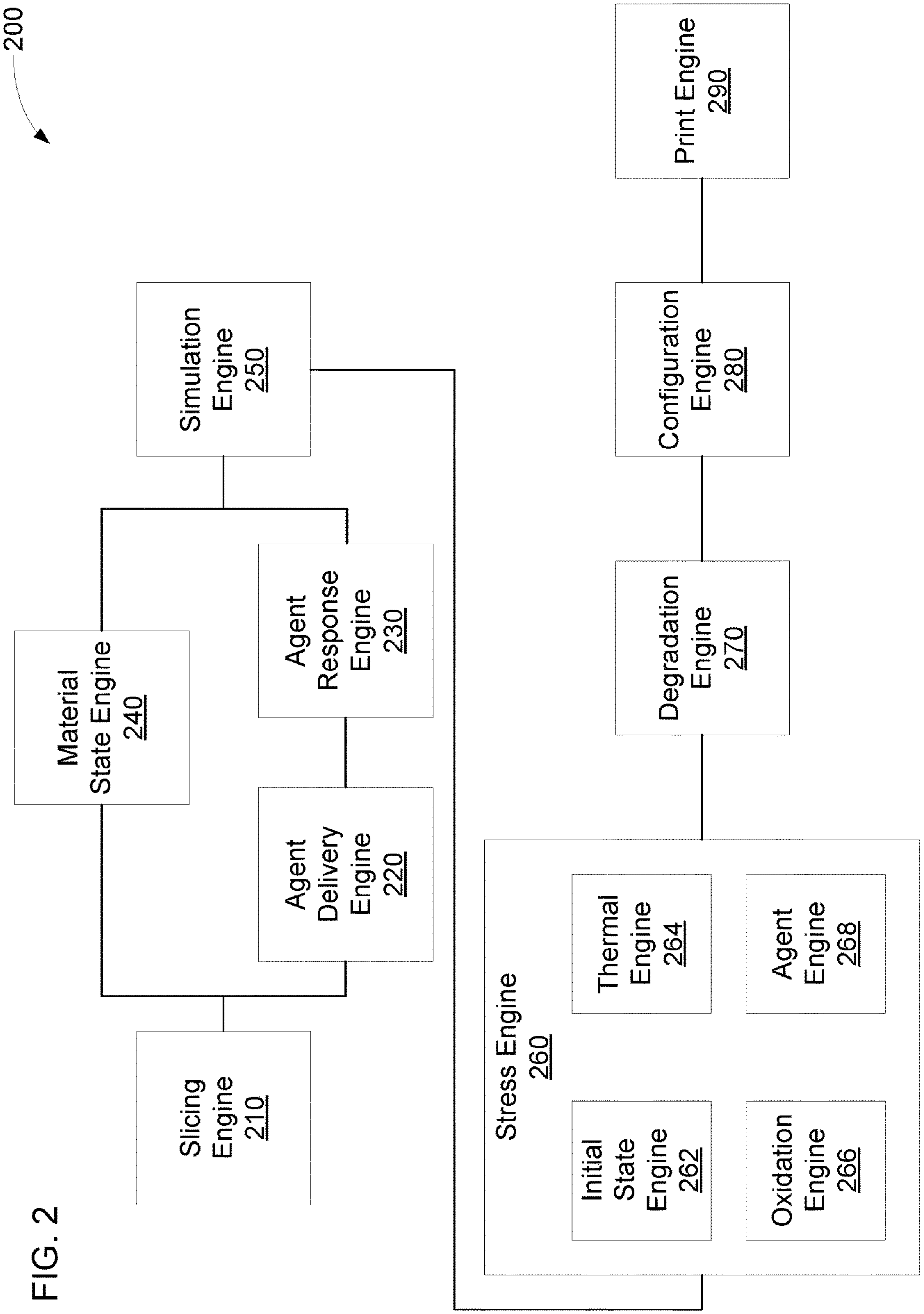
FIG. 2 is a block diagram of another example system to determine how much powder degradation will occur for a particular 3D print.

FIG. 2 is a block diagram of another example system 200 to determine how much powder degradation will occur for a particular 3D print. The system 200 may include a slicing engine 210. The slicing engine 210 may slice a build file to determine a plurality of voxels. The build file may include data that describes a plurality of parts to be printed within a print volume, including the pose of the parts within the print volume. The slicing engine 210 may slice the build file by dividing the print volume into a plurality of voxels. In some examples, the print volume may be a rectangular prism, and the voxels may be rectangular prisms. For example, the slicing engine 210 may slice the print volume with planes parallel to the XY plane, the YZ plane, and XZ plane to form the voxels. The 3D printer may have a printing resolution, such as a resolution in the XY plane and a resolution along the Z axis. The slicing engine 210 may slice the build file into voxels with sizes equal to the resolution of the 3D printer, into larger voxels, or into smaller voxels. There is a tradeoff between larger voxel sizes that allow for more efficient computation and smaller voxel sizes that provide a finer resolution of the powder degradation.

The system 200 may include an agent delivery engine 220. The agent delivery engine 220 may determine the amount of agent that will be delivered to the powder at each voxel. The agent delivery engine 220 may determine the amount of fusing agent, the amount of detailing agent, the amount of binding agent, the amount of a property modification agent, the amount of a coloring agent, or the like that will be delivered. For example, the agent delivery engine 220 may determine the amount of agent that will be delivered based on the build file. The agent delivery engine 220 may compute a continuous tone image that indicates how much agent will be delivered to each voxel. The agent delivery engine 220 may use a deterministic approach to determine the amount of agent to be delivered to achieve or prevent coalescing (or another property) at various locations, may use a machine learning model to determine the amount of agent to be delivered, or the like. The machine learning model may be trained based on the deterministic approach to achieve similar results more quickly. For example, the machine learning model may quickly determine the amount of agent that will be received by a voxel with a lower resolution than the resolution than the printer without computing continuous tone images at the print resolution. The agent delivery engine 220 may include a separate model or sub-engine to determine the amount of each agent used during the print process. The amount of agent delivered may depend on the model of the 3D printer, the version of software or firmware running on the 3D printer, the configuration of the 3D printer, or the like. Accordingly, the agent delivery engine 220 may determine the amount of agent to be delivered based on the model of the 3D printer, the version of software or firmware, the configuration, or the like.

The system 200 may include an agent response engine 230. The agent response engine 230 may determine a temperature response that will be experienced by the powder at each voxel from the amount of the agent that will be delivered. For example, the 3D printer may apply energy to the print volume, and the amount of agent delivered to a voxel affects how much energy is absorbed by the powder at that voxel. Accordingly, the agent response engine 230 may determine the temperature response based on the amount of agent and the amount of energy to be delivered to the voxel. The agent response engine 230 may determine the amount of energy to be delivered or select a relationship between agent and temperature based on the model of the 3D printer, the version of software or firmware running on the 3D printer, the configuration, or the like. In some examples, the 3D printer may deliver energy to select voxels without use of an agent. In such examples, the system 200 may include an engine to determine the amount of energy delivered to each voxel without determining the amount of agent delivered.

The system 200 may include a material state engine 240 to determine a coalescence state that will result for the powder at each voxel. For example, the material state engine 240 may determine which voxels include a part and which do not based on the slices of the build file. The material state engine 240 may select a coalesced state for voxels that include a part and an uncoalesced state for voxels without a part. In some examples, the material state engine 240 may include various states between coalesced and uncoalesced for voxels that include a part and loose powder.

The system 200 may include a simulation engine 250 to determine a plurality of thermal states that will be experienced by the powder at each voxel as a result of printing the build specified by the build file. For example, the simulation engine 250 may determine an initial thermal state of each voxel based on the results from the agent delivery engine 220 and the agent response engine 230. The simulation engine 250 may determine thermal states after the initial thermal state based on conduction of heat among voxels and loss of heat to the environment. The simulation engine 250 may determine the amount of conduction based on the coalescence state of each voxel determined by the material state engine 240.

The simulation engine 250 may progress through a series of time increments and determine the thermal state of each voxel at each time step. In some examples, not yet printed voxels may be ignored until they are formed. In examples, the simulation engine 250 may generate a four-dimensional (4D) representation of the print volume that includes a temperature for each time and voxel location (e.g., 3D cartesian location). At each time increment, the simulation engine 250 may compute the thermal states for each voxel based on the thermal states from the immediately previous increment, the agent response for any new voxels, and the loss of thermal energy at the boundary of the print volume. The time increment may be selected based on the desired resolution. Larger increments may allow for quicker computation and smaller increments may provide more precise results for the thermal experience of each voxel. Different time increments may be selected for time when the printer is printing versus when the print volume is cooling. In some examples, the time increments for printing may be selected to have a plurality of time increments during the formation of each voxel (e.g., at the resolution generated by the slicing engine 210). The time increments during cooling may be larger (e.g., an order of magnitude or two larger). The simulation engine 250 may generate thermal states for each voxel from its formation until the end of the cooling period.

The system 200 may include a stress engine 260. The stress engine 260 may calculate a stress to the powder at each voxel. The stress engine 260 may determine the stress based on the plurality of thermal states. The stress engine 260 may determine impacts of environmental factors on the amount of degradation of the powder at each voxel. As used herein, the term “environment” refers to anything at the voxel or surrounding the voxel that affects the degradation of the powder at a voxel. The term “environmental factor” refers to an attribute or limited set of attributes of the environment that affect the degradation of the powder at a voxel. The environmental factors may include heat, oxygen, agents, or the like. The term “impact” refers to a value (e.g., an alphanumeric value) representative of the influence of the environmental factor on the degradation of the powder. The impact may represent how the environmental factor will interact with the stress to produce degradation of the powder (e.g., how the environmental factor will amplify or dampen the effects of the stress).

In the illustrated example, the stress engine 260 includes an initial state engine 262, a thermal engine 264, an oxidation engine 266, and an agent engine 268. The initial state engine 262 may determine an initial value indicative of an initial amount of powder degradation prior to printing. For example, the initial state engine 262 may determine the initial value based on the quality metric (e.g., b*) of the powder before printing, which may be determined from measuring the powder or based on the results of a previous simulation. Measurements may be input by a user, received from a measuring device, or retrieved from a non-transitory computer-readable medium. For some materials, the change in quality metric may be non-linearly related to the stress. For example, the change in quality metric for a particular stress may depend on the initial state of the quality metric. The initial state engine 262 may determine the initial value by converting the initial quality metric to a value in a domain with a linear relationship to a stress.

The thermal engine 264 may determine heat interactions with the powder at the voxel that will result in stress to the powder. For example, the thermal engine 264 may determine the stress to each voxel from the thermal states of that voxel throughout the printing process. The thermal engine 264 may determine the thermal stress based on a version of the Arrhenius equation. In an example, the thermal engine 264 may compute the thermal stress according to the equation:

$$\sigma_{Thermal} = \sum_i t_i e^{\left(a_0 - \frac{E_a}{RT_i}\right)}$$

Where $\sigma_{Thermal}$ is the thermal stress at a voxel, the sum is over all time increments i, $t_i$ is the duration of time increment i, $a_0$ is a constant specific to the material, $E_a$ is the activation energy and is specific to the material and environment, R is the gas constant, and $T_i$ is the temperature of the voxel at time increment i.

The oxidation engine 266 may determine oxidative interaction with the powder at the voxel that will result in stress to the powder. For example, the amount of degradation may depend on the amount of oxygen present at each voxel, which may in turn depend on whether oxygen is able to diffuse away from the voxel. The oxidation engine 266 may determine based on the pose of parts in the print volume whether there is coalesced powder blocking oxygen from diffusing. For example, the oxidation engine 266 may use the results from the material state engine 240 to determine which voxels will be in a coalesced state that prevents diffusion. Based on the states of the voxels, the oxidation engine 266 may determine how much oxygen is able to diffuse away from the voxel. The oxidation engine 266 may determine a value for each voxel indicative of how much interaction there will be between oxygen and the powder at that voxel, which value may be referred to as an oxidation metric.

The agent engine 268 may determine printing agent interaction with the powder at the voxel that will result in stress to the powder. For example, a detailing agent, a fusing agent, a binding agent, a property modification agent, a coloring agent, or the like may be applied to the powder. The amount of degradation of the powder may depend on the amount of agent present at each voxel or at neighboring voxels. The agent engine 268 may receive from the agent delivery engine 220 an indication of how much agent will be delivered to each voxel. The agent engine 268 may determine a value for each voxel indicative of how much the agents may interact with that voxel, which value may be referred to as an agent metric. The agent engine 268 may use the indication received from the agent delivery engine 220 as the agent metric or may compute the agent metric based on the indication.

The system 200 may include a degradation engine 270. The degradation engine 270 may determine an amount of degradation of the powder at the voxel based on the stress.

For example. The degradation engine 270 may compute the amount of degradation based on the initial value from the initial state engine 262, the thermal stress from the thermal engine 264, the oxidation metric from the oxidation engine 266, and the agent metric from the agent engine 268. In some examples, the degradation engine 270 may receive multiple values from the initial state engine 262, the thermal engine 264, the oxidation engine 266, and the agent engine 268. For example, the agent engine 268 may include a value for each type of agent that may interact with a voxel, or separate values may be produced based on separate equations or models that capture different ways in which heat, oxygen, or agent interact with the powder at the voxel.

The degradation engine 270 may compute, for each voxel, a quality metric or change in quality metric that will result from the particular print job. In an example using PA12, the degradation engine 270 may compute a b* value that will result from the print job or a change in b* value that will result from the print job. In some examples, the degradation engine 270 may compute a value indicative of the amount of degradation in the same domain as the initial value from the initial state engine and convert the computed value into the quality metric domain (e.g., the b* domain). In examples, the degradation engine 270 may compute the quality metric directly without first computing a value in an intermediate domain.

The degradation engine 270 may include a machine learning model to compute the quality metric based on the values from the stress engine 260. The machine learning model may include a support vector regression, a neural network, or the like. For each voxel, the machine learning model may receive the initial value from the initial state engine 262, the thermal stress, the oxidation metric, the agent metric, or multiple such values and output the quality metric or change in quality metric for that voxel that will result from the print job. The machine learning model may be trained based on data from actual print jobs. For example, the inputs for the machine learning model during training may be computed as discussed above based on the build file for the actual print job. The ground truth for the output from the machine learning model may be determined by measuring the quality metric (e.g., the b* value) for the powder at a particular voxel (e.g., a sample of powder from the particular voxel). Containers or cages may be used to retain powder for measurement while allowing environmental factors to interact with the retained powder. The machine learning model can be trained using values in the quality metric domain as ground truth, or the ground truth quality metric values can be converted to ground truth intermediate values used to train the machine learning model.

The system 200 may include a configuration engine 280. The configuration engine 280 may select a configuration of the three-dimensional print based on the amount of degradation. For example, the configuration engine 280 may select a ratio of fresh powder to recycled powder to use during the three-dimensional print. The configuration engine 280 may include previously specified rules or receive user specified rules about the quality metric. The rules may specify that the quality metric for a worst-case voxel, average voxel, median voxel, or the like remain below a particular threshold. The configuration engine 280 may determine based on a quality metric for the recycled powder how much fresh powder to add to meet the specifications of the rules. The quality metric for the recycled powder may have been measured or computed by the degradation engine 270 for a previous print job. In a PA12 example, the configuration engine 280 may compute the b* value that results from combining recycled and fresh powder by computing a weighted root mean square of the b* values for each powder added weighted by the amount of that powder added. The configuration engine 280 may compute an initial quality metric value that will result in the print job satisfying the rules and determine the amount of fresh powder to add to achieve that initial quality metric value. In some examples, the configuration engine 280 may select the configuration of the three-dimensional print by modifying settings of the three-dimensional printer, modifying the print job, or the like.

The system 200 may include a print engine 290. The print engine 290 may instruct a 3D printer to print the print job with the selected configuration. For example, the print engine 290 may transmit a build file, indications of printer settings, indications of the amount of fresh or recycled powder to use, or the like to the 3D printer and may indicate to the 3D printer to print using the transmitted information. The 3D printer may operate according to the transmitted information to form a print volume corresponding to the build file according to the specified settings with powder from the specified sources.

Figure 3:
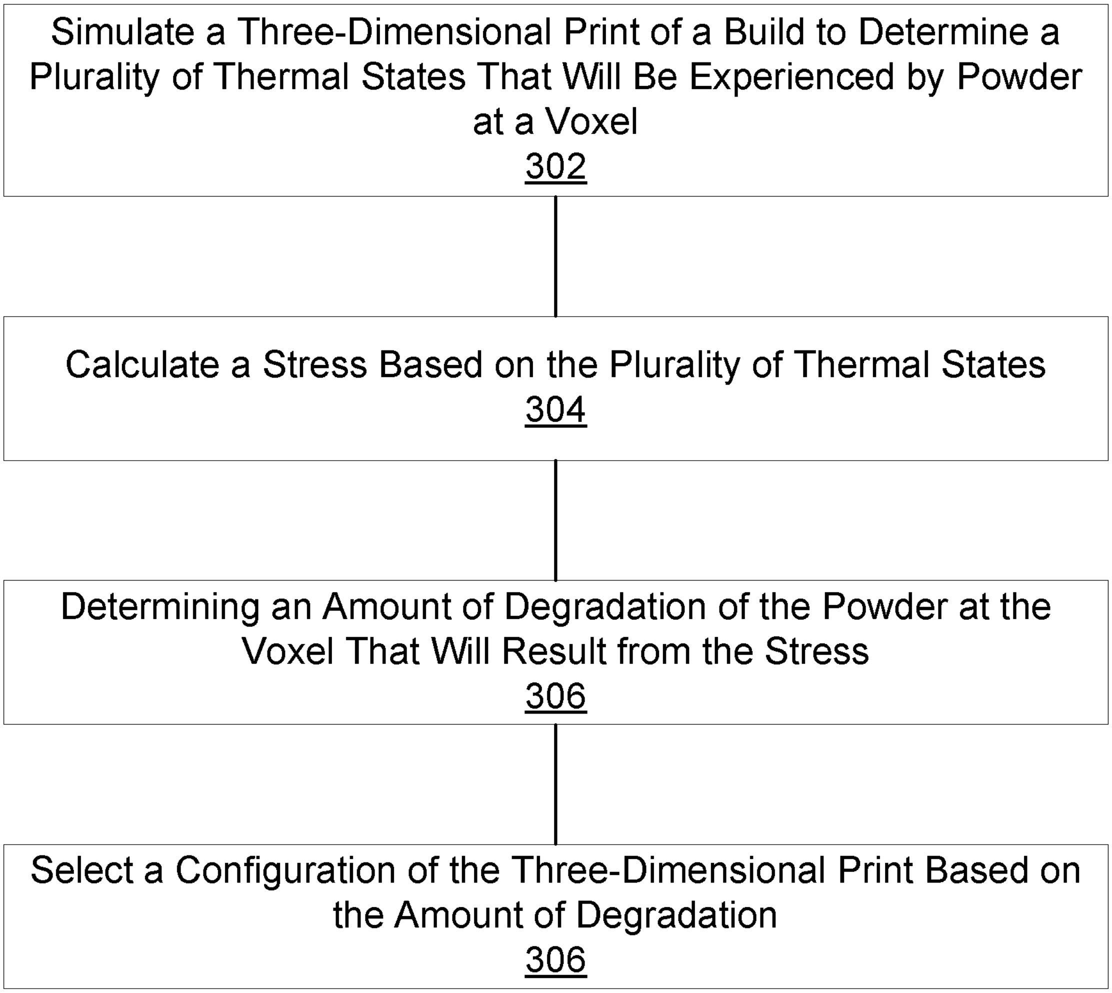
FIG. 3 is a flow diagram of an example method to determine how much powder degradation will occur for a particular 3D print.

FIG. 3 is a flow diagram of an example method 300 to determine how much powder degradation will occur for a particular 3D print. A processor may perform elements of the method 300. For illustrative purposes, the method 300 is described in connection with the device of FIG. 2. However, other devices may perform the method in other examples. At block 302, the method 300 may include simulating a 3D print of a build to determine a plurality of thermal states that will be experienced by powder at a voxel of a three-dimensional print volume due to the three-dimensional print. Each thermal state may correspond to a time during the printing or cooling from the printing. For example, the simulation engine 250 may simulate the 3D print in any of the manners previously discussed.

Block 304 may include calculating a stress based on the plurality of thermal states. For example, the stress engine 260 may calculate a stress in any of the manners previously discussed. At block 306, the method 300 may include determining an amount of degradation of the powder at the voxel that will result from the stress. For example, the degradation engine 270 may determine the amount of degradation in any of the manners previously discussed. Block 308 may include selecting a configuration of the 3D print based on the amount of degradation. For example, the configuration engine 308 may select the configuration in any of the manners previously discussed.

Figure 4:
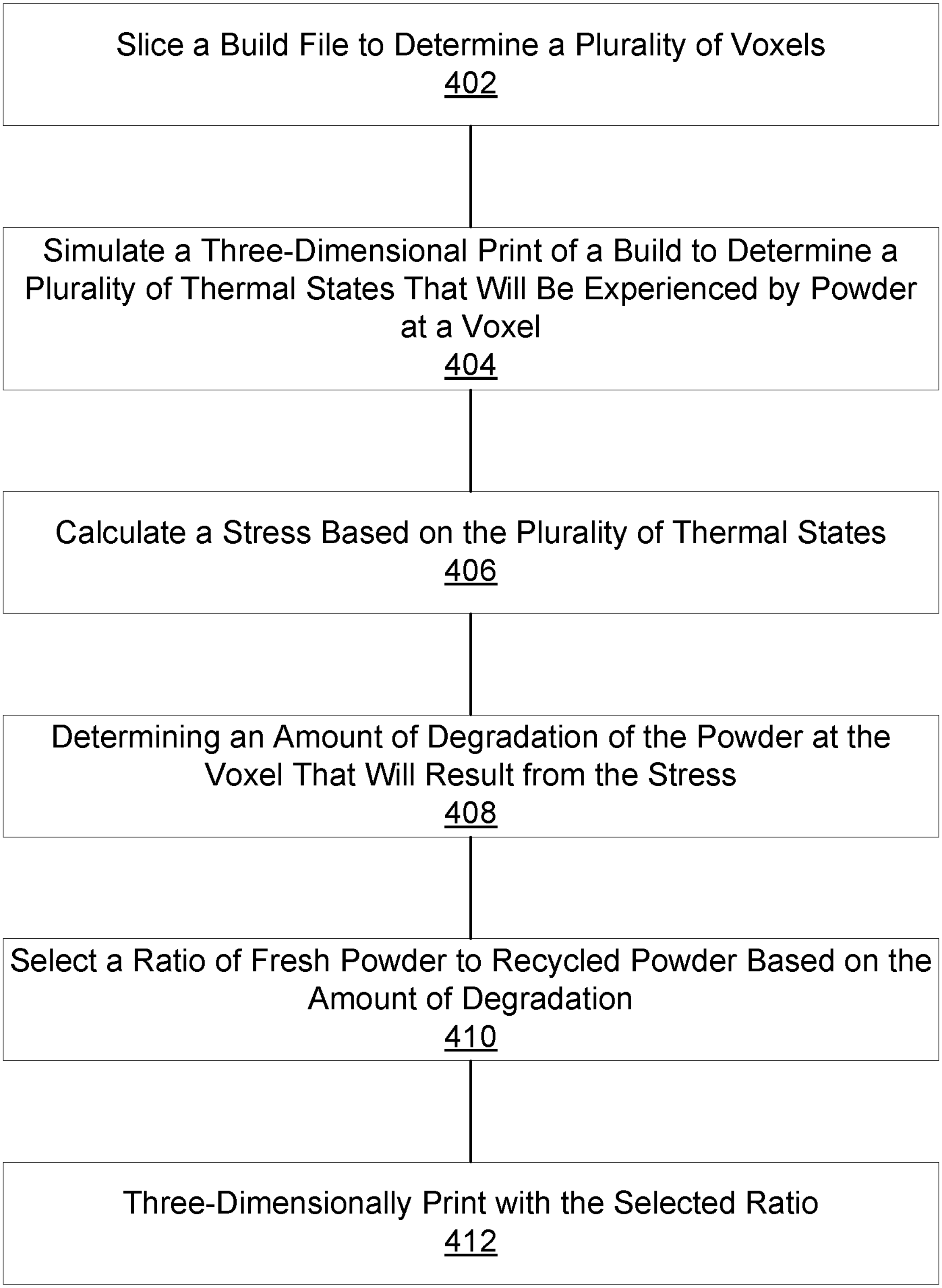
FIG. 4 is a flow diagram of another example method to determine how much powder degradation will occur for a particular 3D print.

FIG. 4 is a flow diagram of another example method to determine how much powder degradation will occur for a particular 3D print. A processor may perform elements of the method 400. For illustrative purposes, the method 400 is described in connection with the device of FIG. 2. However, other devices may perform the method in other examples. Block 402 may include slicing a build file to determine a plurality of voxels. For example, the slicing engine 210 may slide the build file in any of the manners previously discussed. At block 404, the method 400 may include simulating a three-dimensional print of a build to determine a plurality of thermal states that will be experienced by powder at a voxel of a three-dimensional print volume due to the three-dimensional print. Simulating the 3D print may include simulating heat conduction between the plurality of voxels over time and heat losses to the environment. Each thermal state may correspond to a time during the printing or cooling from the printing. The simulation engine 250 may simulate the 3D print in any of the manners previously discussed, for example, based on data from the agent delivery engine 220, agent response engine 230, or material state engine 240.

Block 406 may include calculating a stress based on the plurality of thermal states. For example, the stress engine 260 may calculate the stress in any of the manners previously discussed. At block 408, the method 400 may include determining an amount of degradation of the powder at the voxel that will result from the stress. For example, the degradation engine 270 may determine the amount of degradation of the powder at the voxel in any of the manners previously discussed. Block 410 may include selecting a configuration of the three-dimensional print based on the amount of degradation. More specifically, block 410 may include selecting a ratio of fresh powder to recycled powder to use during the three-dimensional print. For example, the configuration engine 280 may select the ratio of fresh powder to recycled powder in any of the manners previously discussed. At block 412, the method 400 may include 3D printing with the selected configuration (e.g., the selected ratio). For example, the print engine 290 may cause a 3D printer to print in any of the manners previously discussed. In some examples, the 3D printer may print by selectively fusing powder layer-by-layer in a print volume to form an object.

Figure 5:
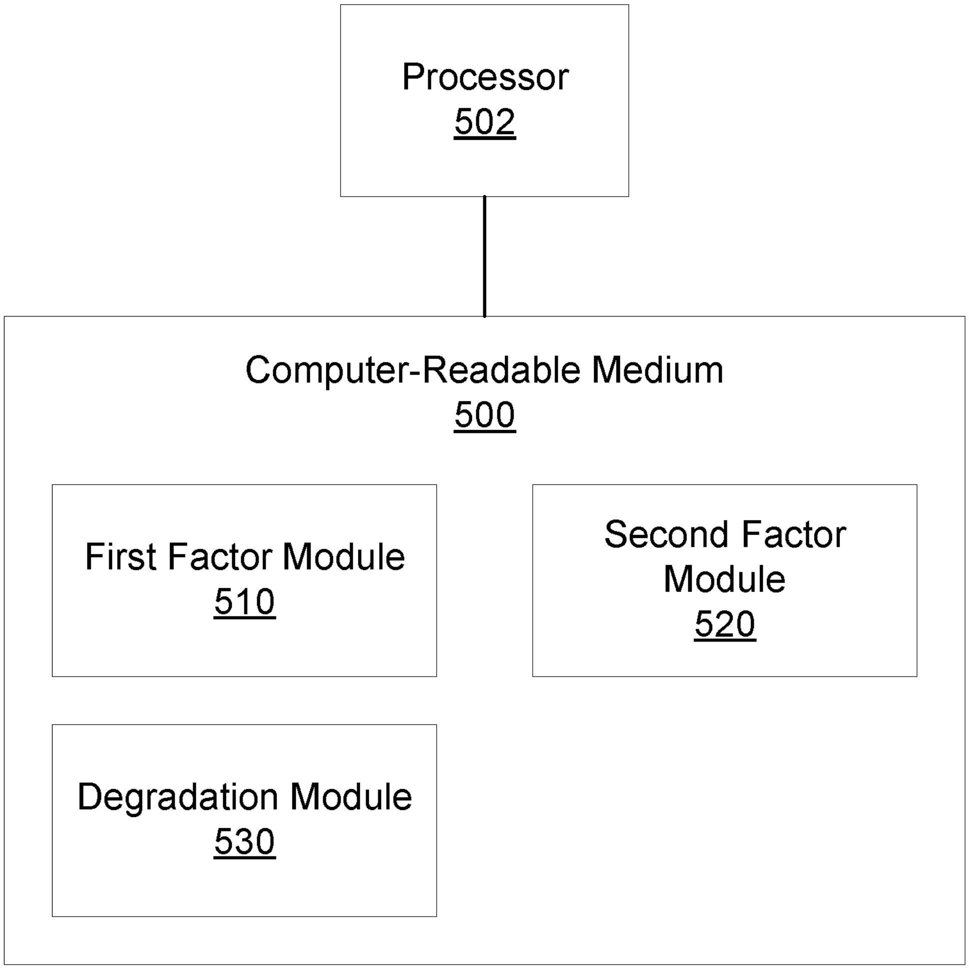
FIG. 5 is a block diagram of an example computer-readable medium including instructions that cause a processor to determine how much powder degradation will occur for a particular 3D print.

FIG. 5 is a block diagram of an example computer-readable medium 500 including instructions that, when executed by a processor 502, cause the processor 502 to determine how much powder degradation will occur for a particular 3D print. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 500 may include a first factor module 510, a second factor module 520, and a degradation module 530. As used herein, a "module" (in some examples referred to as a "software module") is a set of instructions that when executed or interpreted by a processor or stored at a processor-readable medium realizes a component or performs a method. The first factor module 510 may include instructions that, when executed, cause the processor 502 to determine a first impact of a first environmental factor that will cause degradation of powder at a voxel of a three-dimensional print volume due to printing a particular build. In some examples, the first factor module 510 may implement the stress engine 120 when executed and may determine the first impact of the first environmental factor in any of the manners previously discussed.

The second factor module 520 may cause the processor 502 to determine a second impact of a second environmental factor that will cause degradation of the powder at the voxel of the three-dimensional print volume due to printing the particular build. In some examples, the second factor module 520 may implement the stress engine 120 when executed and may determine the second impact of the second environmental factor in any of the manners previously discussed. The degradation module 530 may cause the processor 502 to determine an amount of degradation of the powder at the voxel based on the first environmental factor and the second environmental factor. In some examples, the degradation module 530 may implement the degradation engine 130 when executed and may determine the amount of degradation in any of the manners previously discussed.

Figure 6:
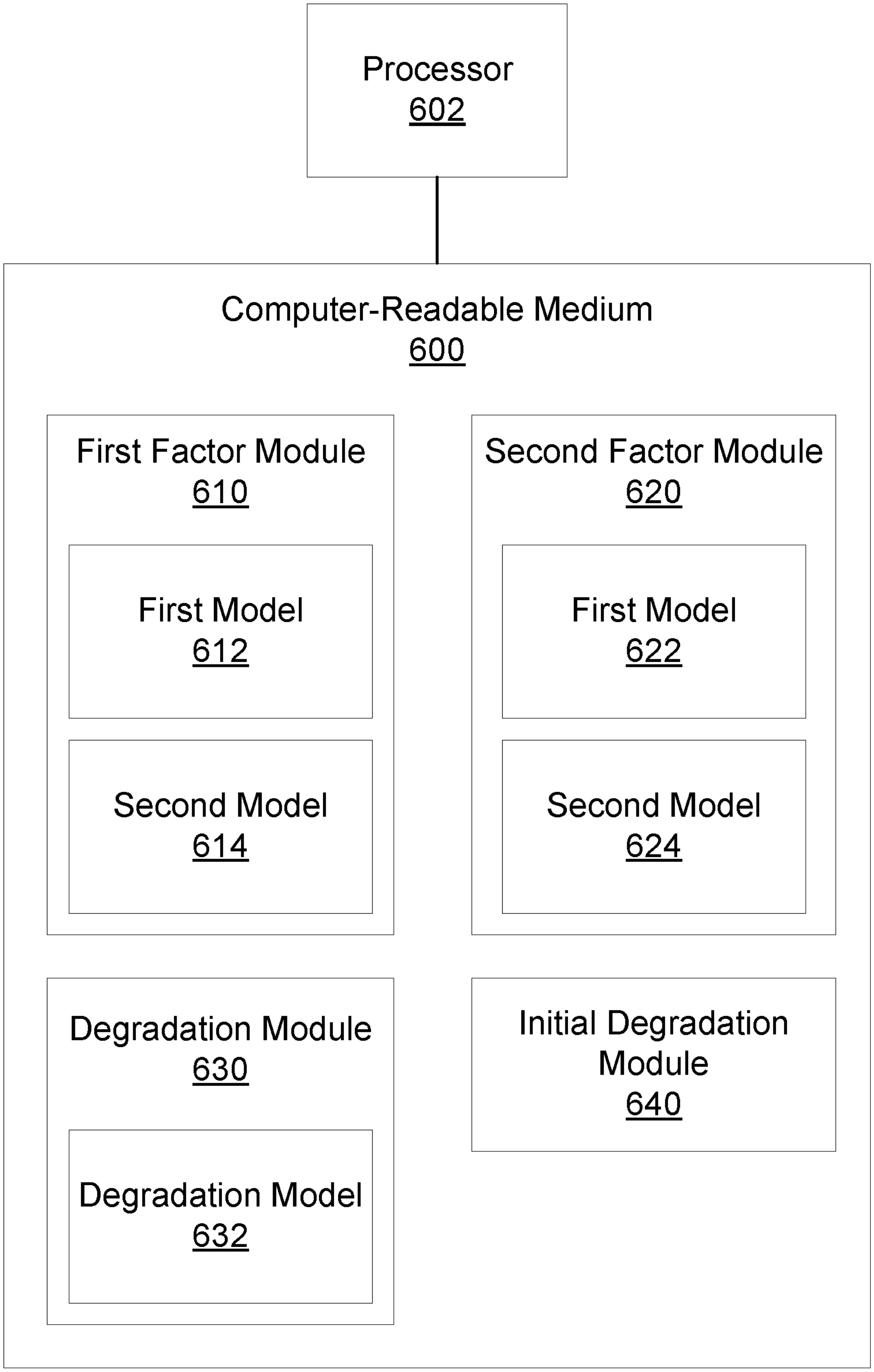
FIG. 6 is a block diagram of another example computer-readable medium including instructions that cause a processor to determine how much powder degradation will occur for a particular 3D print.

FIG. 6 is a block diagram of another example computer-readable medium 600 including instructions that, when executed by a processor 602, cause the processor 602 to determine how much powder degradation will occur for a particular 3D print. The computer-readable medium 600 may include a first factor module 610, which may include a first model 612 and a second model 614, a second factor module 620, which may include a first model 622 and a second model 624, a degradation module 630, which may include a degradation model, and an initial degradation module 640. The first factor module 610 may cause the processor 602 to determine a first impact of a first environmental factor that will cause degradation of powder at a voxel of a three-dimensional print volume due to printing a particular build. The first factor module 610 may cause the processor 602 to use the first model 612 to represent interactions between the first environmental factor and the powder at the voxel to determine the first impact and to use the second model 614 to represent interactions between the first environmental factor and the powder at the voxel to determine a third impact. The second factor module 620 may cause the processor 602 to determine a second impact of a second environmental factor that will cause degradation of powder at a voxel of a three-dimensional print volume due to printing a particular build. The second factor module 620 may cause the processor 602 to use the first model 622 to represent interactions between the second environmental factor and the powder at the voxel to determine the second impact and to use the second model 624 to represent interactions between the second environmental factor and the powder at the voxel to determine a fourth impact. In some examples, the first factor module 610 or the second factor module 620 may implement the thermal engine 264, the oxidation engine 266, or the agent engine 268 when executed and may determine the first, second, third, or fourth impact in any of the manners previously discussed.

The initial degradation module 640 may cause the processor 602 to determine an initial amount of powder degradation prior to printing based on an initial color of the powder. In some examples, the initial degradation module 640 may implement the initial state engine 262 when executed and may determine the initial amount of powder degradation in any of the manners previously discussed. The degradation module 630 may cause the processor 602 to determine an amount of degradation of the powder at the voxel based on the initial amount of powder degradation, the first impact, the second impact, the third impact, or the fourth impact. The degradation model 632 may include a neural network, a support vector regression, or the like. The degradation module 630 may cause the processor 602 to use the neural network or support vector regression to determine the amount of degradation of the powder. The degradation module 630 may cause the processor 602 determine the amount of degradation of the powder by determining a final color of the powder after printing, for example, by cause the neural network or support vector regression to output the final color. In some examples, the degradation module 630 may implement the degradation engine 270 when executed and may determine the amount of degradation of the powder in any of the manners previously discussed.

The above description is illustrative of various principles and implementations of the present disclosure. Numerous variations and modifications to the examples described herein are envisioned. Accordingly, the scope of the present application should be determined only by the following claims.

What is claimed is:

1. A system comprising:
a processor; and
a memory storing instructions executable by the processor to:
determine a plurality of thermal states that will be experienced by powder at a voxel of a three-dimensional print volume as a result of printing a particular build, wherein each thermal state corresponds to a time during printing or during cooling after printing;
determine an initial amount of powder degradation prior to printing, based on an initial color of the powder;
calculate a stress to the powder at the voxel based on the plurality of thermal states; and
determine an amount of degradation of the powder at the voxel based on the initial amount of powder degradation and the stress, by determining a final color of the powder after printing.

2. The system of claim 1, wherein the instructions are executable by the processor to further determine impacts of environmental factors on the amount of degradation of the powder at the voxel, and
wherein the amount of degradation of the powder at the voxel is determined by using a machine learning machine that determines the amount of degradation of the powder at the voxel based on the initial amount of powder degradation, the stress, and the impacts of the environmental factors.

3. The system of claim 2, wherein the instructions are executable by the processor to further
determine heat interactions with the powder at the voxel that will result in stress to the powder;
determine oxidative interaction with the powder at the voxel that will result in stress to the powder; and
determine printing agent interaction with the powder at the voxel that will result in stress to the powder.

4. The system of claim 1, wherein the instructions are executable by the processor to further determine an amount of an agent that will be delivered to the powder at the voxel and a material state engine to determine a coalescence state of the powder at the voxel, and
wherein the plurality of thermal states is determined based on the amount of the agent that will be delivered and the coalescence state.

5. The system of claim 4, wherein the instructions are executable by the processor to further determine a temperature response that will be experienced by the powder at the voxel from the amount of the agent that will be delivered, and
wherein the plurality of thermal states is further determined based on the temperature response that will be experienced.

6. The system of claim 1, wherein the instructions are executable by the processor to perform three-dimensional printing using a three-dimensional print configuration that is selected based on the amount of degradation.

7. The system of claim 6, wherein the three-dimensional print configuration comprises a ratio of fresh powder to recycled powder to use during three-dimensional printing.

8. A method comprising:
simulating, by a processor, a three-dimensional print of a build to determine a plurality of thermal states that will be experienced by powder at a voxel of a three-dimensional print volume due to the three-dimensional print, wherein each thermal state corresponds to a time during printing or during cooling after printing;
determining, by the processor, an initial amount of powder degradation prior to printing, based on an initial color of the powder;
calculating, by the processor, a stress based on the plurality of thermal states;
determining, by the processor, an amount of degradation of the powder at the voxel that will result from the stress, based on the initial amount of powder degradation and the stress, by determining a final color of the powder after printing; and
selecting, by the processor, a three-dimensional print configuration based on the amount of degradation.

9. The method of claim 8, further comprising slicing, by the processor, a build file to determine a plurality of voxels including the voxel,
wherein simulating the three-dimensional print comprises simulating heat conduction between the plurality of voxels over time and environmental heat losses.

10. The method of claim 8, wherein selecting the three-dimensional print configuration comprises selecting a ratio of fresh powder to recycled powder to use during three-dimensional printing.

11. The method of claim 8, further performing three-dimensional printing using the selected three-dimensional print configuration.

12. A non-transitory computer-readable medium storing instructions that when executed by a processor, cause the processor to:
determine a first impact of a first environmental factor that will cause degradation of powder at a voxel of a three-dimensional print volume due to printing a particular build;
determine an initial amount of powder degradation prior to printing, based on an initial color of the powder;
determine a second impact of a second environmental factor that will cause degradation of the powder at the voxel of the three-dimensional print volume due to printing the particular build; and
determine an amount of degradation of the powder at the voxel based on the initial amount of powder degradation, the first impact, and the second impact, by determining a final color of the powder after printing.

13. The non-transitory computer-readable medium of claim 12, wherein the instructions cause the processor to use a first model to represent interactions between the first environmental factor and the powder at the voxel to determine the first impact and to use a second model to represent interactions between the first environmental factor and the powder at the voxel to determine a third impact.

14. The non-transitory computer-readable medium of claim 12, wherein the instructions cause the processor to use a neural network or a support vector regression to determine the amount of degradation of the powder at the voxel based on the initial amount of powder degradation, the first impact, and the second impact.

15. The non-transitory computer-readable medium of claim 12, wherein when executed by the processor, the instructions further cause the processor to perform three-dimensional printing using a three-dimensional print configuration that is selected based on the amount of degradation.

16. The non-transitory computer-readable medium of claim 15, wherein the three-dimensional print configuration comprises a ratio of fresh powder to recycled powder to use during the three-dimensional printing.

* * * * *